(No Model.)
T. W. SYNNOTT.
MACHINE FOR MAKING GLASS BOTTLES.
No. 468,140. Patented Feb. 2, 1892.
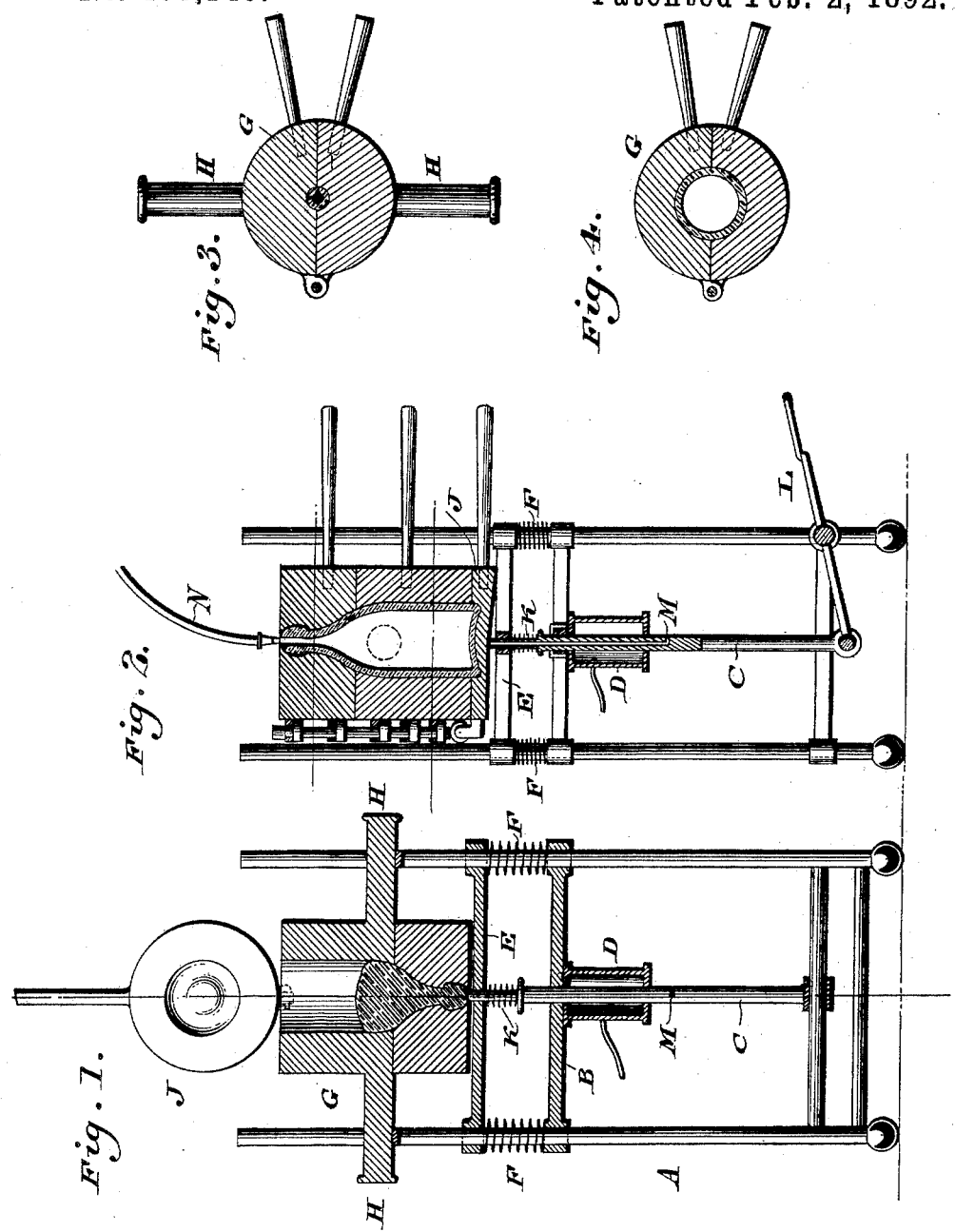

UNITED STATES PATENT OFFICE.

THOMAS W. SYNNOTT, OF WENONAH, NEW JERSEY.

MACHINE FOR MAKING GLASS BOTTLES.

SPECIFICATION forming part of Letters Patent No. 468,140, dated February 2, 1892.

Application filed July 13, 1891. Serial No. 399,332. (No model.)

*To all whom it may concern:*

Be it known that I, THOMAS W. SYNNOTT, a citizen of the United States, residing at Wenonah, in the county of Gloucester and State of New Jersey, have invented a new and useful Improvement in Machines for Making Glass Bottles, which improvement is fully set forth in the following specification and accompanying drawings.

My invention consists of a machine for making glass bottles, embodying novel means for primarily supplying the mold with metal or glass, forming the bore of the mouth and neck of the bottle, and blowing the body of the bottle, as will be hereinafter set forth.

Figures 1 and 2 represent vertical sections of a bottle-making machine embodying my invention. Figs. 3 and 4 represent horizontal sections thereof.

Similar letters of reference indicate corresponding parts in the several figures.

Referring to the drawings, A designates a frame on which is supported the horizontal cross-head B, through which freely passes the hollow plunger C, the latter also freely passing through the cylinder or receiver D for compressed air, said cylinder being secured to the cross-head B. On the frame A, above the cross-head B, is a sliding cross-head E, between which and the cross-head B are springs F for elevating said cross-head E.

G designates a bottle-mold, the same being formed in sections, the members of each of which are hinged together, so that the sections may be separated and the mold accordingly opened. Projecting from the side of the mold are journals H, whereby the mold may be inverted, said journals being mounted on the upper part of the frame A.

J designates the bottom of the mold, the same being connected with the body of the mold and adapted to be removed therefrom.

The upper end of the plunger C is adapted to form the bore of the mouth and neck of a bottle, and it passes freely through the cross-head E. A spring K bears against the cross-head E and a shoulder on the plunger for lowering the latter, and a treadle L is connected with the plunger for raising the same.

In the wall of the plunger is a port M, the same communicating with the bore of the plunger.

The operation is as follows: The bottom J is removed and the mold inverted. The central portion of the cross-head E and the top of the plunger C now closes the opening at the bottom of the mold as inverted. Molten glass is then poured into the mold so as to partly fill the same, and the plunger raised so as to enter the glass and form the bore of the mouth and neck of a bottle. As the plunger rises, the port M enters the cylinder D, whereby the air in the latter enters the plunger and is forcibly and mechanically directed through the same into the glass, thus forming a space in the glass, or partially blowing the same. The bottom J is now applied to the open top of the mold, so as to cover the same, and the treadle let go, whereby the plunger emerges from the glass and the port M is outside of the receiver D, thus cutting off the supply of air to the plunger. The mold is then inverted so that the glass drops therein and the cross-head E depressed to permit the bottom of the mold to pass above the same, after which said cross-head presses the bottom forcibly against the body of the mold. (See Fig. 2.) A pipe N is now directed into the partially-blown glass, whereby air is forced into the space of the same, thus completely blowing the glass and forming the bottle. The sections of the mold may then be opened and the bottle relieved if stuck. The bottle is then fully removed from the mold, after which the latter is closed and again inverted. The bottom is now detached and the parts are in position shown in Fig. 1, when the mold may be supplied with molten glass, and the operations as hereinbefore stated repeated.

When the mold is inverted to the position shown in Fig. 2, it may be found that the glass frequently adheres to the same, owing to the heated condition thereof. In such case the body part of the mold is partly opened, so as to detach the glass therefrom and allow it to draw freely or drop, after which the mold is again quickly closed and the air applied, when the operation of forming or blowing the bottle is completed.

Having thus described my invention, what I claim as new, and desire to secure by Letters Patent, is—

1. In a machine for making glass bottles, a rotatable mold composed of hinged top, side, and bottom sections, said side sections having journals extending therefrom, and bearings for said journals, substantially as and for the purpose set forth.

2. A machine for making glass bottles, having a receiver for compressed air and a hollow plunger which is provided with a port, said plunger freely extending through said receiver, whereby the plunger may be placed in communication with said receiver and air forced into the molten glass in a mold, and a rotatable mold mounted above said plunger, substantially as described.

3. A machine for making glass bottles, having a mold, said mold having journals thereon and being composed of hinged sections, a frame supporting the same, a movable cross-head mounted on said frame, an air-receiver, and a plunger movable in said receiver and which is adapted to be passed through said cross-head into said mold, substantially as described.

4. A machine for making glass bottles, having a movable hollow plunger which is adapted to enter the bottle-forming mold, and an air-receiver surrounding and in which said plunger is movable, the plunger having a port in its side leading to the interior thereof, whereby communication between the receiver and plunger may be established to direct air into the molten glass, combined with a rotatable mold, substantially as described.

THOMAS W. SYNNOTT.

Witnesses:
JOHN A. WEIDERSHEIM,
A. P. JENNINGS.